United States Patent
Zhao et al.

(10) Patent No.: US 12,093,649 B2
(45) Date of Patent: Sep. 17, 2024

(54) DEPENDENCY TREE-BASED DATA AUGMENTATION FOR SENTENCE WELL-FORMEDNESS JUDGEMENT

(71) Applicant: International Business Machines Corporation, Armonk, NY (US)

(72) Inventors: Yang Zhao, Tokyo (JP); Masayasu Muraoka, Tokyo (JP); Issei Yoshida, Tokyo (JP)

(73) Assignee: International Business Machines Corporation, Armonk, NY (US)

( * ) Notice: Subject to any disclaimer, the term of this patent is extended or adjusted under 35 U.S.C. 154(b) by 709 days.

(21) Appl. No.: 17/303,278

(22) Filed: May 26, 2021

(65) Prior Publication Data
US 2022/0382981 A1    Dec. 1, 2022

(51) Int. Cl.
| | |
|---|---|
| *G06F 40/289* | (2020.01) |
| *G06F 40/205* | (2020.01) |
| *G06F 40/211* | (2020.01) |
| *G06F 40/253* | (2020.01) |
| *G06N 5/01* | (2023.01) |
| *G06N 7/01* | (2023.01) |
| *G06N 20/00* | (2019.01) |

(52) U.S. Cl.
CPC .......... *G06F 40/289* (2020.01); *G06F 40/205* (2020.01); *G06F 40/211* (2020.01); *G06F 40/253* (2020.01); *G06N 5/01* (2023.01); *G06N 7/01* (2023.01); *G06N 20/00* (2019.01)

(58) Field of Classification Search
CPC .... G06F 40/289; G06F 40/253; G06F 40/205; G06F 40/211; G06N 20/00; G06N 7/01; G06N 5/01
See application file for complete search history.

(56) References Cited

U.S. PATENT DOCUMENTS 5,418,717 A * 5/1995 Su .................. G06F 40/216
704/9

OTHER PUBLICATIONS

Şahin, Gözde Gül, and Mark Steedman, "Data Augmentation via Dependency Tree Morphing for Low-Resource Languages", Oct. 2018, Proceedings of the 2018 Conference on Empirical Methods in Natural Language Processing, pp. 5004-5009. (Year: 2018).*
Wei, Jason, and Kai Zou, "EDA: Easy Data Augmentation Techniques for Boosting Performance on Text Classification Tasks", Nov. 2019, Conference on Empirical Methods in Natural Language Processing and the 9th International Joint Conference on Natural Language Processing, pp. 6382-6388. (Year: 2019).*

(Continued)

*Primary Examiner* — Daniel C Washburn
*Assistant Examiner* — James Boggs
(74) *Attorney, Agent, or Firm* — Stephen R. Yoder

(57) ABSTRACT

A computer-implemented method, a computer program product, and a computer system for dependency tree-based data augmentation for sentence well-formedness judgement. A computer applies a dependency parser to generate a dependency tree for a sentence. The computer removes one or more nodes in the dependency tree, according to a removal ratio for a predetermined rating score. The computer generates, from the dependency tree, a partial tree for the sentence. The computer outputs a rated sentence based on the partial tree. The rated sentence is used as training data.

25 Claims, 9 Drawing Sheets

(56) References Cited

OTHER PUBLICATIONS

Trung, Huynh Thanh, Tong Van Vinh, Nguyen Thanh Tam, Hongzhi Yin, Matthias Weidlich, and Nguyen Quoc Viet Hung, "Adaptive Network Alignment with Unsupervised and Multi-order Convolutional Networks", Apr. 2020, 2020 IEEE 36th International Conference on Data Engineering (ICDE), pp. 85-96. (Year: 2020).*
Filippova, Katja, and Yasemin Altun, "Overcoming the Lack of Parallel Data in Sentence Compression", Oct. 2013, Proceedings of the 2013 Conference on Empirical Methods in Natural Language Processing, pp. 1481-1491. (Year: 2013).*
Galanis, Dimitrios, and Ion Androutsopoulos, "An extractive supervised two-stage method for sentence compression", Jun. 2010, Human Language Technologies: The 2010 Annual Conference of the North American Chapter of the Association for Computational Linguistics, pp. 885-893. (Year: 2010).*
Cohn, Trevor, and Mirella Lapata, "Sentence Compression as Tree Transduction", Apr. 2009, Journal of Artificial Intelligence Research 34, pp. 637-674. (Year: 2009).*
Filippova, Katja, and Michael Strube, "Dependency Tree Based Sentence Compression", Jun. 2008, Proceedings of the Fifth International Natural Language Generation Conference, pp. 25-32. (Year: 2008).*
Brockett, et al., "Correcting ESL Errors Using Phrasal SMT Techniques", Proceedings of the 21st International Conference on Computational Linguistics and 44th Annual Meeting of the ACL, 2006, pp. 249-256.
Duan, et al., "Syntax-aware Data Augmentation for Neural Machine Translation", arXiv:2004.14200v1, Apr. 29, 2020, 9 pages, <https://www.researchgate.net/publication/341040258>.
Felice et al., "Generating Artificial Errors for Grammatical Error Correction", Proceedings of the Student Research Workshop at the 14th Conference of the European Chapter of the Association for Computational Linguistics, 2014, pp. 116-126.
Handler, et al., "Human acceptability judgements for extractive sentence compression", arXiv:1902.00489v1, Feb. 1, 2019, 12 pages, <https://www.researchgate.net/publication/330845187>.
Zumi et al., "Automatic Error Detection in the Japanese Learners' English Spoken Data", The Companion Volume to the Proceedings of 41st Annual Meeting of the Association for Computational Linguistics, 2003, 4 pages.
Kann et al., "Sentence-Level Fluency Evaluation: References Help, But Can Be Spared!", arXiv:1809.08731v1, 2018, 11 pages.
Mell et al., "The NIST Definition of Cloud Computing", National Institute of Standards and Technology, Special Publication 800-145, Sep. 2011, 7 pages.
Wagner, et al., "Judging Grammaticality: Experiments in Sentence Classification", CALICO Journal, 26 (3), Jan. 2013, pp. 474-490, <https://www.researchgate.net/publication/45686359>.
Warstadt, et al., "Neural Network Acceptability Judgments", Transactions of the Association for Computational Linguistics, vol. 7 (1), Mar. 2019, pp. 625-641, <https://www.researchgate.net/publication/336172941>.
Zhao et al., "Improving Grammatical Error Correction via Pre-Training a Copy-Augmented Architecture with Unlabeled Data", Proceedings of NAACL-HLT, 2019, pp. 156-165.

* cited by examiner

DEPENDENCY TREE-BASED DATA AUGMENTATION FOR SENTENCE WELL-FORMEDNESS JUDGEMENT

BACKGROUND

The present invention relates generally to natural language processing, and more particularly to dependency tree-based data augmentation for sentence well-formedness judgement.

In judging to what degree a natural language sentence is well-formed, previous works mostly focus on predicting whether a sentence is well-formed or not, which is a binary rating. Specifically, these previous works train a machine learning-based binary classifier with data; however, very often there is lack of training data. Even for a most widely used language (e.g., English), there have been few large-scale corpuses due to the time-consuming and costly nature of human annotation. To address the issue of data scarcity, both rule-based noise injection and statistics noise learned injection techniques have been proposed.

Izumi et al. (Automatic Error Detection in the Japanese Learners' English Spoken Data, The Companion Volume to the Proceedings of 41st Annual Meeting of the Association for Computational Linguistics, 2003), Brockett et al. (Correcting ESL Errors Using Phrasal SMT Techniques, Proceedings of the 21st International Conference on Computational Linguistics and 44th Annual Meeting of the ACL, 2006), and Zhao et al. (Improving Grammatical Error Correction via Pre-Training a Copy-Augmented Architecture with Unlabeled Data, Proceedings of NAACL-HLT, 2019) propose the rule-based noise injection technique. The rule-based noise injection technique is heuristics in nature and requires expert knowledge for each language.

Felice et al. (Generating Artificial Errors for Grammatical Error Correction, Proceedings of the Student Research Workshop at the 14th Conference of the European Chapter of the Association for Computational Linguistics, 2014) proposes the statistics noise learned injection technique. The statistics noise learned injection technique learns noise injection from corpuses to conduct error analysis, which is not available for many languages, especially low-resource ones.

SUMMARY

In one aspect, a computer-implemented method for dependency tree-based data augmentation for sentence well-formedness judgement is provided. The computer-implemented method includes applying a dependency parser to generate a dependency tree for a sentence. The computer-implemented method further includes removing one or more nodes in the dependency tree, according to a removal ratio in a set of removal ratios for a predetermined rating score. The computer-implemented method further includes generating, from the dependency tree, a partial tree for the sentence. The computer-implemented method further includes outputting a rated sentence based on a partial tree, where the rated sentence is used as training data.

In another aspect, a computer program product for dependency tree-based data augmentation for sentence well-formedness judgement is provided. The computer program product comprises a computer readable storage medium having program instructions embodied therewith, and the program instructions are executable by one or more processors. The program instructions are executable to: apply a dependency parser to generate a dependency tree for a sentence; remove one or more nodes in the dependency tree, according to a removal ratio for a predetermined rating score; generate, from the dependency tree, a partial tree for the sentence; and output a rated sentence based on the partial tree, wherein the rated sentence is used as training data.

In yet another aspect, a computer system for dependency tree-based data augmentation for sentence well-formedness judgement is provided. The computer system comprises one or more processors, one or more computer readable tangible storage devices, and program instructions stored on at least one of the one or more computer readable tangible storage devices for execution by at least one of the one or more processors. The program instructions are executable to apply the dependency parser to generate a dependency tree for a sentence. The program instructions are further executable to remove one or more nodes in the dependency tree, according to a removal ratio for a predetermined rating score. The program instructions are further executable to generate, from the dependency tree, a partial tree for the sentence. The program instructions are further executable to output a rated sentence based on the partial tree, where the rated sentence is used as training data.

In yet another aspect, a computer-implemented method for dependency tree-based data augmentation for sentence well-formedness judgement is provided. The computer-implemented method includes applying a dependency parser to generate a dependency tree for a sentence. The computer-implemented method further includes sampling tokens that are to be removed from the dependency tree, according to a removal ratio for a predetermined rating score and a dependency tag probability distribution. The computer-implemented method further includes removing one or more nodes in the dependency tree, according to sampled tokens. The computer-implemented method further includes generating, from the dependency tree, a partial tree for the sentence. The computer-implemented method further includes outputting a rated sentence based on the partial tree, where the rated sentence is used as training data.

In yet another aspect, a computer program product for dependency tree-based data augmentation for sentence well-formedness judgement is provided. The computer program product comprises a computer readable storage medium having program instructions embodied therewith, and the program instructions are executable by one or more processors. The program instructions are executable to: apply a dependency parser to generate a dependency tree for a sentence; sample tokens that are to be removed from the dependency tree, according to a removal ratio for a predetermined rating score and a dependency tag probability distribution; remove one or more nodes in the dependency tree, according to sampled tokens; generate, from the dependency tree, a partial tree for the sentence; and output a rated sentence based on the partial tree, where the rated sentence is used as training data.

DETAILED DESCRIPTION

Judging to what degree a natural language sentence is well-formed is easy for a human but challenging for a machine. Namely, the task is to score a sentence with a multiple fluency or grammaticality rating scale (e.g., a 3-point scale). For example, "The weather in Tokyo is so good today." is a perfectly well-formed sentence (Rating: 3.0), while "The weather Tokyo so good!" contains grammar issues but still comprehensible (Rating: 2.0). In another example, "He saw the man with a telescope." is well-formed; however, "He the man with a telescope." is not well-formed (Rating 1.0) because the main verb is missing.

A multiple rating scale of sentence well-formedness is beneficial to (i) ranking outputs from a text generation system according to its degree of well-formedness for a better end-user experience (e.g., dialogue generation system or financial summarization system), (ii) detecting grammar errors in a document to reduce human labor in a business process of correcting or proofreading documents.

In judging to what degree a natural language sentence is well-formed, previous works are mostly focusing on predicting whether a sentence is well-formed or not, using a binary rating scale rather than a multiple rating scale. Embodiments of the present invention focus on a multiple rating scale.

Embodiments of the present invention provide solutions that overcome the lack of training data and minimize effort (expert knowledge) in covering as many languages as possible. Embodiments of the present invention propose data augmentation method based on a dependency tree that is universally applied to multiple languages. Embodiments of the present invention use a universal dependency tree (which covers multiple languages) to represent a tree structure of a sentence. The nodes in the dependency tree are tokens in the sentence, while the edges refer to relations between nodes.

In embodiments of the present invention, a key idea is to use the following two properties. (1) The more tokens (nodes) being removed, the more ill-formed the resting sentence is. (2) Tokens (nodes) are not equally important. For example, removing tokens (nodes) more close to a ROOT node, such as tokens with a tag of nsubj (nominal subject), makes a sentence more ill-formed, compared to removing tokens far from a ROOT node such as tokens with a tag of a mod (adjective modifier).

Figure 1:
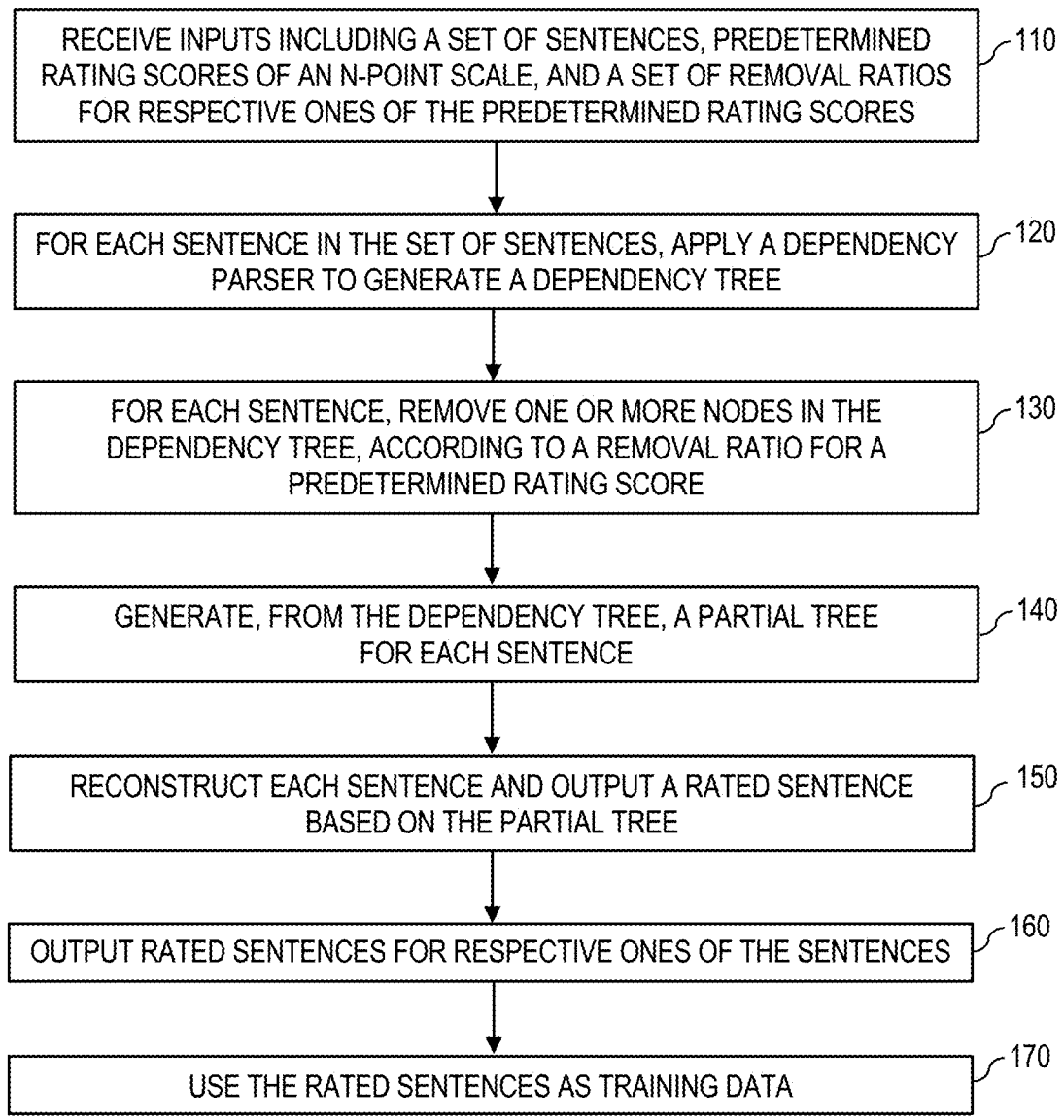
FIG. 1 presents a flowchart showing operational steps of dependency tree-based data augmentation for sentence well-formedness judgement, in accordance with one embodiment of the present invention.

FIG. 1 presents a flowchart showing operational steps of dependency tree-based data augmentation for sentence well-formedness judgement, in accordance with one embodiment of the present invention. The operational steps shown in FIG. 1 are implemented by a computing device or a server. A computing device or server is described in more detail in later paragraphs with reference to FIG. 7. In some embodiments, the operational steps may be implemented in a cloud computing environment. The cloud computing environment is described in later paragraphs with reference to FIG. 8 and FIG. 9.

At step 110, the computing device or server receives inputs including a set of sentences, predetermined rating scores of an n-point scale, and a set of removal ratios for respective ones of the predetermined rating scores. S is a set of sentences. R is predetermined rating scores of an n-point scale, and R is determined by the number of classes in the multiple classifications in an English fluency evaluation benchmark. For example, {1.0, 1.2, 1.4, 1.6, 1.8, 2.0, 2.2, 2.4, 2.6, 2.8, 3.0} are predetermined rating scores of an 11-point scale. U is a set of removal ratios for respective ones of the predetermined rating scores. U(r) is a removal ratio for a rating score r in R. U(r) is empirically determined by the compression rate of the sentence compression in a benchmark dataset. For example, U(1.0)=70%, U(1.2) =60%, U(2.8)=5%, and U(3.0)=0%. Compressing 70% of the tokens in a sentence is usually very aggressive, according to sentence compression research. So, it is set as an upper bound and the resting U(r) values are just naturally set from 60% to 0%.

At step 120, the computing device or server, for each sentence in the set of sentences, applies a dependency parser to generate a dependency tree. For each x in S, a dependency parser is applied to generate a dependency tree T(x). As shown in an example presented in FIG. 2, the dependency parser is applied to sentence 210—"He saw the man with a telescope." Dependency tree 220 is generated for sentence 210.

At step 130, the computing device or server, for each sentence, removes one or more nodes in the dependency tree, according to a removal ratio for a predetermined rating score. At step 140, the computing device or server generates, from the dependency tree, a partial tree for each sentence. For each r in R, the computing device or server removes a certain percent of nodes from T(x) according to a removal ratio that is defined by U(r). Let S(x) be a set of partial trees each including remaining nodes. Implementation details of removing nodes in the dependency tree will be discussed in later paragraphs with reference to FIG. 3.

Figure 2:
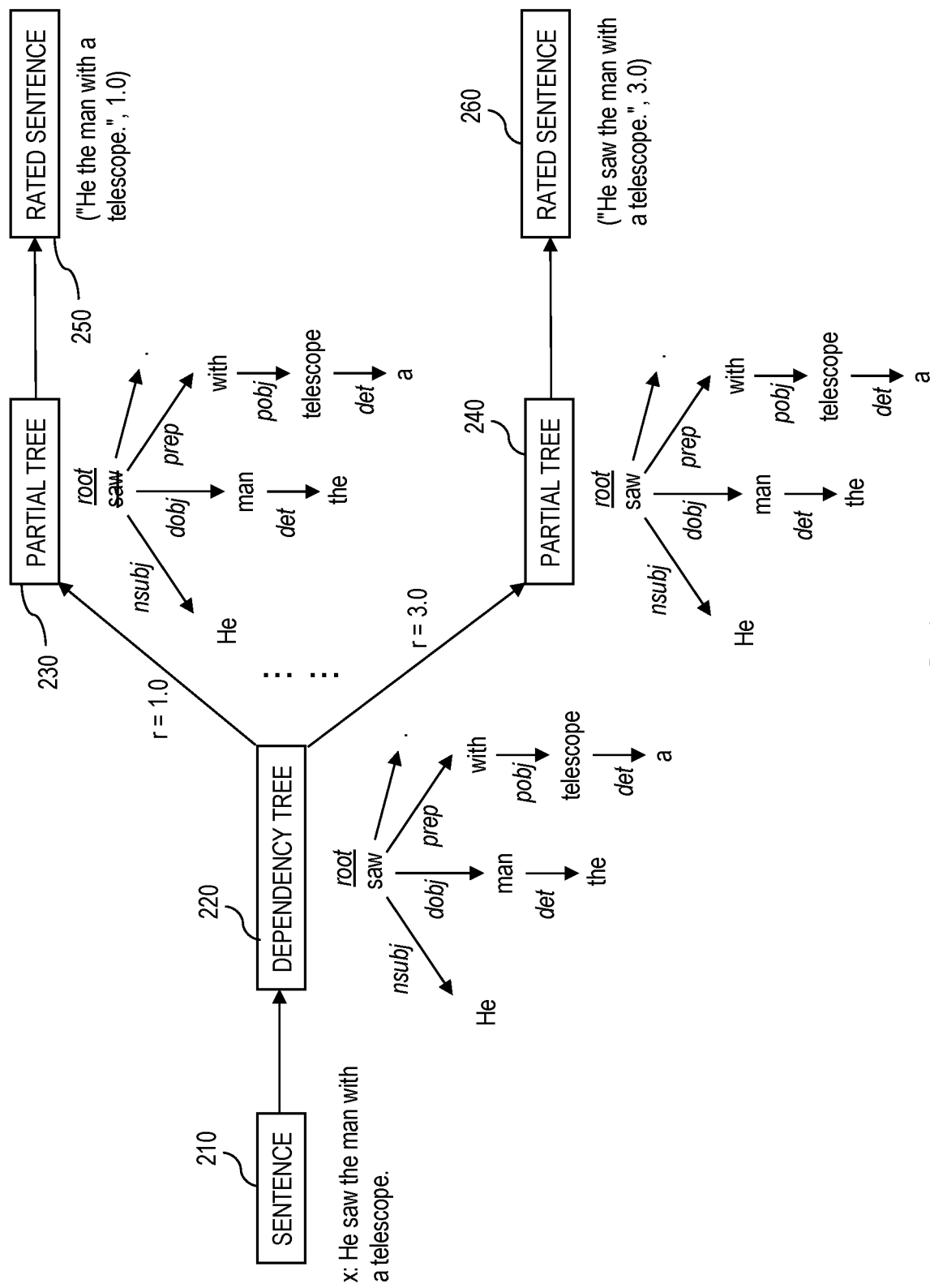
FIG. 2 is a diagram illustrating an example of operational steps shown in FIG. 1, in accordance with one embodiment of the present invention.

As shown in an example presented in FIG. 2, for rating scores of a 11-point scale (mentioned in a previous paragraph), partial tree 230 is generated from dependency tree 220 for a rating score of 1 (r=1.0), and partial tree 240 is generated from dependency tree 220 for a rating score of 3 (r=3.0). For the purpose of illustration, FIG. 2 shows only two partial trees (one for r=1 and the other for r=3; other partial trees (such as partial trees for r=1.2, 1.4, 1.6, 1.8, 2.0, 2.2, 2.4, 2.6, and 2.8) are not shown. For a rating score of 1 (r=1), node "ROOT" is removed; for a rating score of 3 (r=3), no node is removed.

At step 150, the computing device or server reconstructs each sentence and outputs a rated sentence based on the partial tree. The computing device or server reconstructs a sentence x, gets a reconstructed sentence y, and adds (y, r) to the output as a rated sentence. As shown in an example presented in FIG. 2, the sentence is reconstructed and rated sentence 250 is outputted: (y, r)=("He the man with a telescope.", 1.0), or rated sentence 260 is outputted: (y, r)=("He saw the man with a telescope.", 3.0). To avoid the bias by any specific sentence, one sentence x is used to generate only one (y, r) pair used in the later data augmentation.

At step 160, the computing device or server outputs rated sentences for the respective ones of the sentences. For example, for the sentence of "He saw the man with a telescope.", the computing device or server outputs a set of rated sentences; the set includes: ("He the man with a telescope.", 1.0), . . . , and ("He saw the man with a telescope.", 3.0). At step 170, the computing device or server uses the rated sentences as training data. The rated sentences are obtained for respective sentences in the set of sentences.

Figure 3:
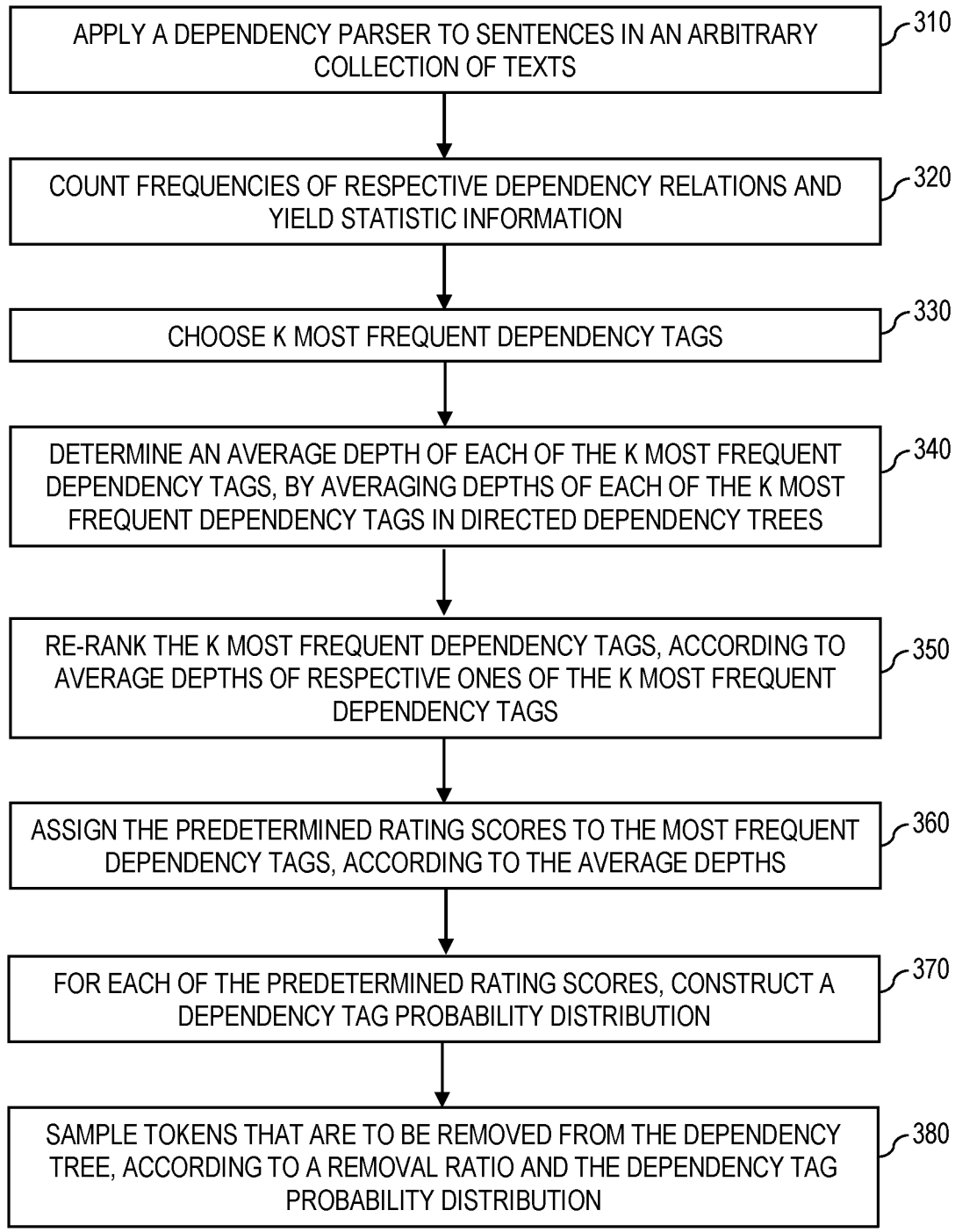
FIG. 3 presents a flowchart showing operational steps of sampling tokens that are to be removed from a dependency tree, in accordance with one embodiment of the present invention.

FIG. 3 presents a flowchart showing operational steps of sampling tokens that are to be removed from a dependency tree, in accordance with one embodiment of the present invention. The operational steps shown in FIG. 3 are an implementation of step 130 shown in FIG. 1. The operational steps shown in FIG. 3 are implemented by a computing device or a server. A computing device or server is described in more detail in later paragraphs with reference to FIG. 7. In some embodiments, the operational steps may be implemented in a cloud computing environment. The cloud computing environment is described in later paragraphs with reference to FIG. 8 and FIG. 9.

Figure 4:
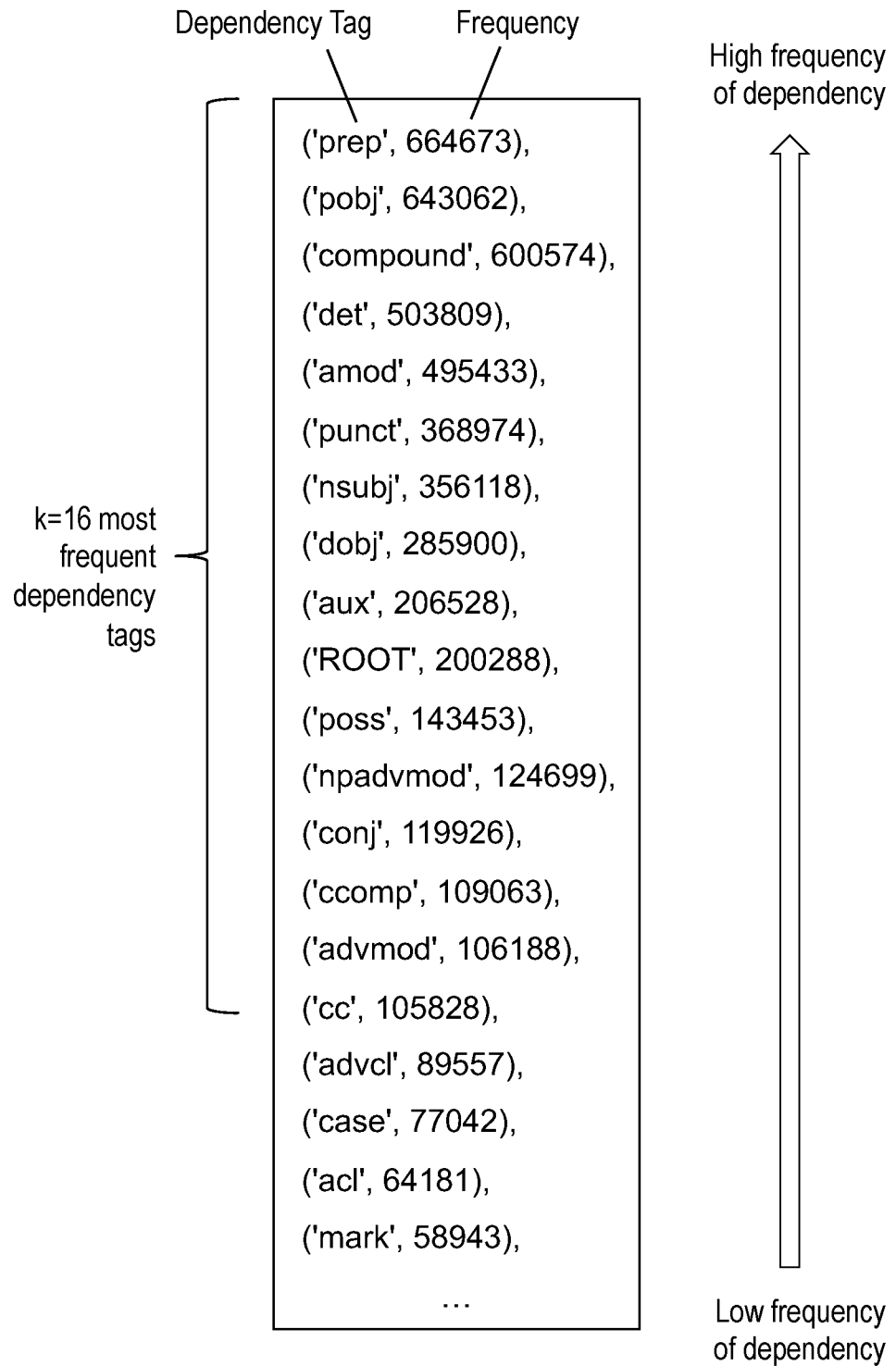
FIG. 4 presents a table including an example of statistic information about a frequency of each dependency relation, in accordance with one embodiment of the present invention.

At step 310, the computing device or server applies a dependency parser to sentences in an arbitrary collection of texts. In an experiment, 200,000 sentences from English Gigaword Fifth Edition were used. At step 320, the computing device or server counts frequencies of respective dependency relations and yields statistic information. An example of the statistic information is presented in FIG. 4, in which a table lists the respective dependency relations (or dependency tags) and their frequencies; for example, the dependency tag "prep" has a frequency of 664,673. As shown in the table in FIG. 4, dependency tags on the top of the list have the highest frequency and frequencies increase from the bottom to the top of the list.

At step 330, the computing device or server chooses k most frequent dependency tags. For example, shown in FIG. 4, 16 most frequent dependency tags are chosen, and the top 16 dependency tags are: dep_tags={prep, pobj, compound, det, a mod, punct, nsubj, dobj, aux, ROOT, poss, npadv mod, conj, ccomp, adv mod, cc}.

At step 340, the computing device or server determines an average depth of each of the k most frequent dependency tags, by averaging depths of the each of the k most frequent dependency tags in directed dependency trees. The average depth of a dependency tag in the k most frequent dependency tags is an average distance of the dependency tag from ROOT, and it indicates the importance of the dependency tag in the k most frequent dependency tags. A dependency tag has different depths in different dependency trees, an average depth of the dependency tag is obtained by averaging the different depths.

Figure 5:
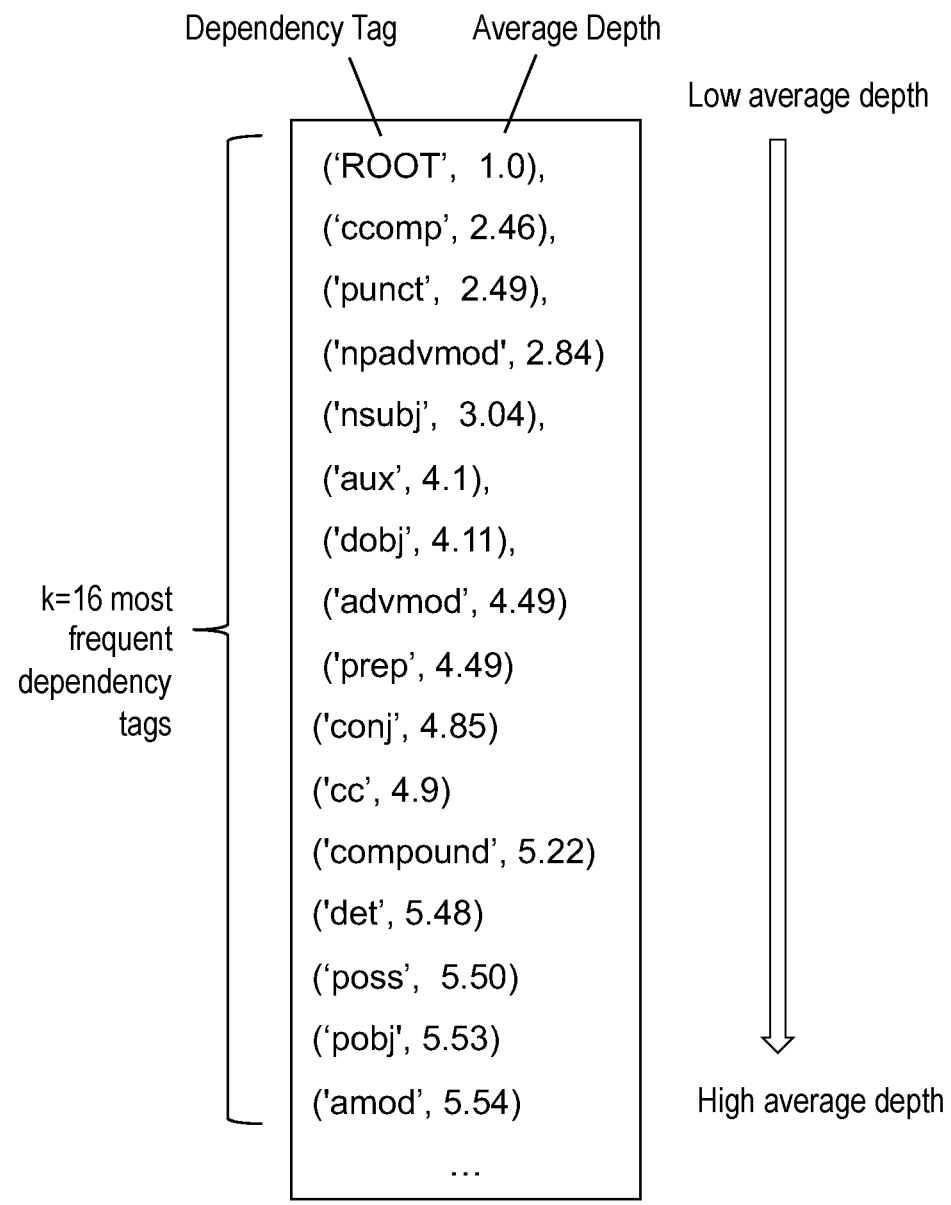
FIG. 5 presents a table including an example of re-ranking tags according to average depths of dependency tags in directed dependency trees, in accordance with one embodiment of the present invention.

At step 350, the computing device or server re-ranks the k most frequent dependency tags, according to average depths of respective ones of the k most frequent dependency tags. FIG. 5 presents a table including an example of re-ranking tags according to average depths of dependency tags in directed dependency trees, in accordance with one embodiment of the present invention. As shown in FIG. 5, 16 most frequent dependency tags are re-ranked according to the average depths of respective ones of the 16 most frequent dependency tags. Dependency tags on the top of the list have lower average depths (or closer distances to ROOT) and dependency tags on the bottom of the list have higher average depths (or farther distances to ROOT).

At step 360, the computing device or server assigns the predetermined rating scores to the most frequent dependency tags, according to the average depths. For example, the computing device or server assigns a rating score of 1.0 (r=1.0) to dependency tags from "ROOT" to "amod" in the table in FIG. 5, a rating score of 1.2 (r=1.2) to dependency tags from "ccomp" to "a mod", and a rating score of 2.8 (r=2.8) to dependency tags from "conj" to "a mod"; the computing device or server also assigns other rating scores (such as 1.4, 1.6, 1.8, 2.0, 2.2, 2.4, 2.6, and 3.0) to other ranges of dependency tags in the table in FIG. 5.

Figure 6:
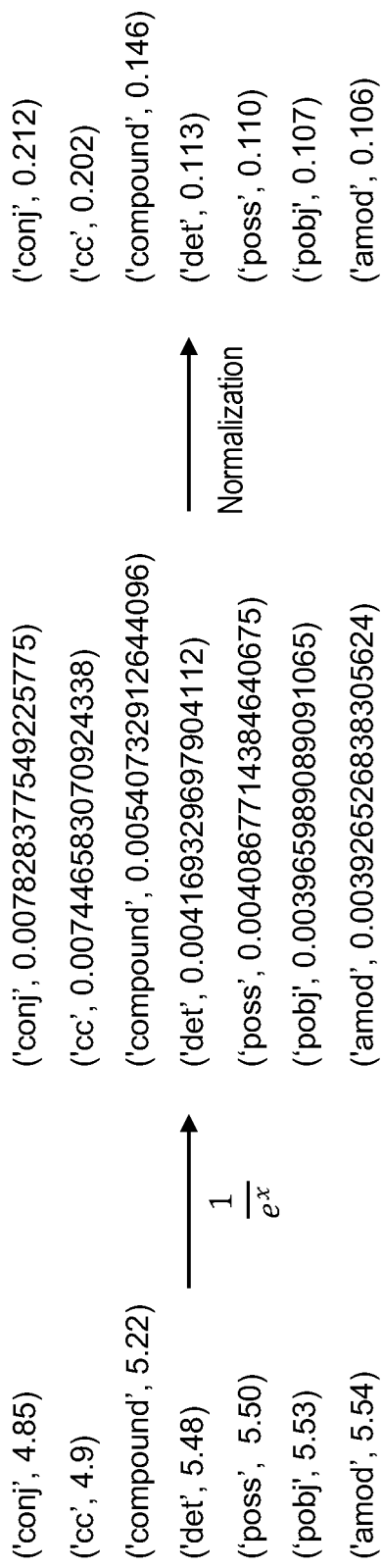
FIG. 6 presents a table including an example of a dependency tag probability distribution, in accordance with one embodiment of the present invention.

At step 370, the computing device or server, for each of the predetermined rating scores, constructs a dependency tag probability distribution. FIG. 6 presents a table including an example of a dependency tag probability distribution for dependency tags assigned a rating score of 2.8 (r=2.8). In the example shown in FIG. 6, the dependency tags from "conj" to "a mod" (including "conj", "cc", "compound", "det", "poss", "proj", and "a mod") are assigned a rating score of 2.8 (r=2.8). In the example shown in FIG. 6, the computing device or server calculates $e^x$ of the average depths (where x is a value of an average depth) and then normalized $e^x$ of the average depths to obtain the dependency tag probability distribution for dependency tags assigned a rating score of 2.8.

At step 380, the computing device or server samples tokens that are to be removed from the dependency tree according to the removal ratio and the dependency tag probability distribution. For example, for a rating score of 2.8 (r=2.8), the removal ratio is 5% (or 0.05); if the computing device or server samples 40 tokens, 40×5%=2, then 2 tokens will be removed from the sentence. In this example, how the two tokens are removed will depend on the dependency tag probability distribution (e.g., the dependency tag probability distribution shown in FIG. 6); the probability of sampling the two "conj" tokens is 0.212.

The method of dependency tree-based data augmentation for sentence well-formedness judgement was evaluated by an experiment using an English fluency evaluation benchmark dataset given in a reference (Kann et al., "Sentence-Level Fluency Evaluation: References Help, But Can Be Spared!", arXiv:1809.08731v1, 2018). This corpus contains around 2,900 sentences. In the experiment, each sentence was coupled with one of the 11 ratings ({1.0, 1.2, 1.4, 1.6, 1.8, 2.0, 2.2, 2.4, 2.6, 2.8, 3.0}) indicating the well-formedness. For training (and development) data, sentences were constructed for each rating using the proposed data augmentation method.

Two methods for the task of predicting the well-formedness rating of a sentence were compared. One method was a baseline which was syntactic log-odds ratio (SLOR) proposed by Kann's reference mentioned above. The score of a sentence S is given by $$SLOR(S)=1/n(\ln(P_{LM}(S))-\ln(P_{uni}(S)))$$

where $P_{LM}(S)$ is sentence probability yielded by BERT-base-uncased (where BERT stands for Bidirectional Encoder Representations from Transformers) and $P_{uni}(S)$ is the token (unigram) frequency estimated by English Gigaword corpus. Another method was proposed in the present invention and it is BERT model fine-tuned with augmented data. The augmented data was created by using English Gigaword Fifth Edition dataset. From the English Gigaword Fifth Edition dataset, 100 unrated sentences were selected for each rating (11 ratings in total) and 1,100 rated sentences were generated. The experimental results showed that the Pearson correlation was 0.454 for the baseline method while the Pearson correlation was 0.526 for the proposed method of the present invention. The experimental results indicated that the proposed method improves accuracy by adding augmented unrated sentences.

The experiment was conducted for randomly removing a certain percent of tokens in the sentences. The experiment was also conducted for randomly removing a certain percent of tokens in the sentences according to token importance distributions (or dependency tag probability distributions). The experimental results showed that the Pearson correlation was 0.494 for the random removal and the Pearson correlation was 0.526 for the random removal according to the token importance distributions. The experimental results indicated that the random removal according to the token importance distributions improves accuracy.

Figure 7:
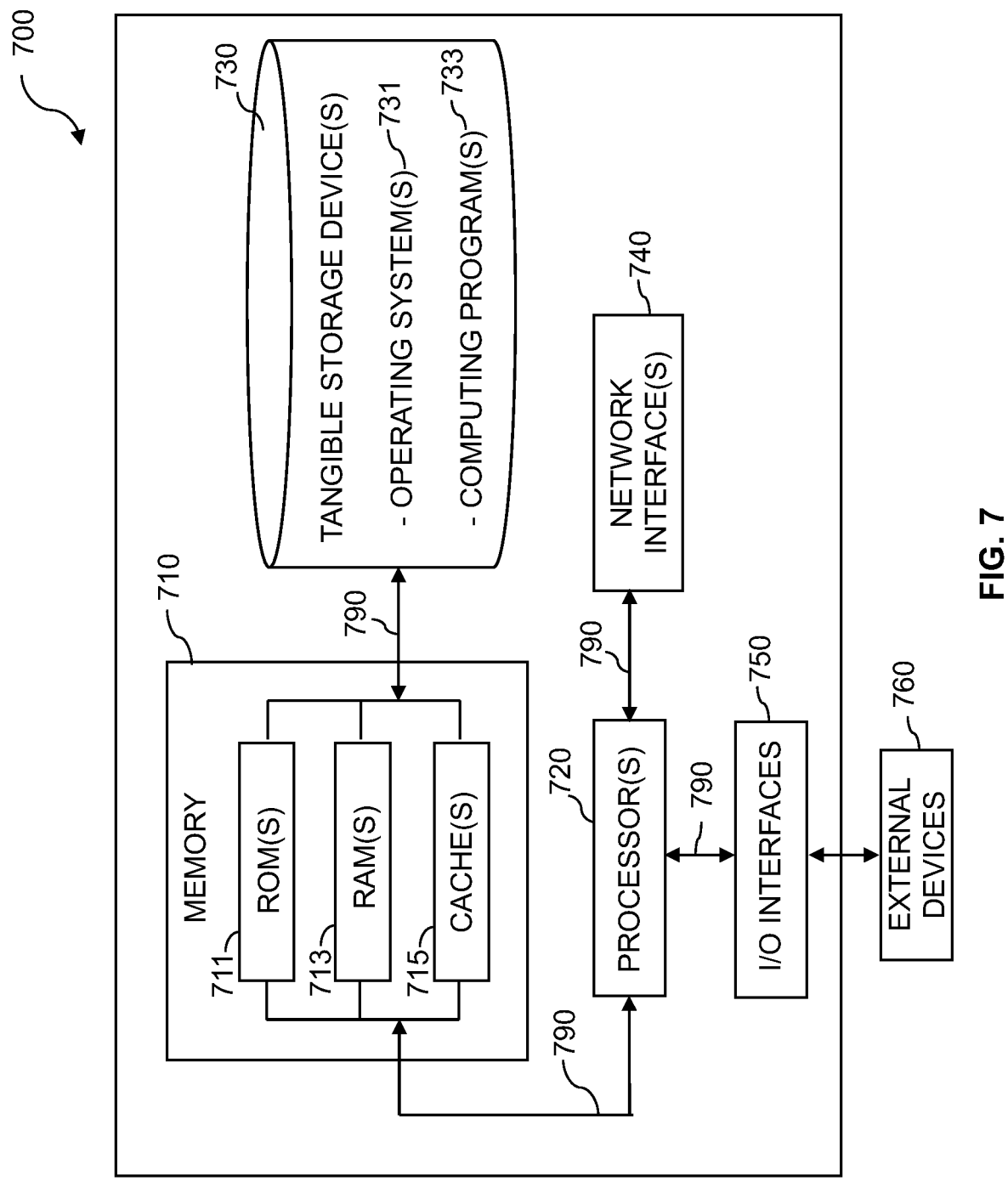
FIG. 7 is a diagram illustrating components of a computing device or server, in accordance with one embodiment of the present invention.

FIG. 7 is a diagram illustrating components of computing device or server 700, in accordance with one embodiment of the present invention. It should be appreciated that FIG. 7 provides only an illustration of one implementation and does not imply any limitations with regard to the environment in which different embodiments may be implemented.

Referring to FIG. 7, computing device or server 700 includes processor(s) 720, memory 710, and tangible storage device(s) 730. In FIG. 7, communications among the above-mentioned components of computing device or server 700 are denoted by numeral 790. Memory 710 includes ROM(s) (Read Only Memory) 711, RAM(s) (Random Access Memory) 713, and cache(s) 715. One or more operating systems 731 and one or more computer programs 733 reside on one or more computer readable tangible storage device(s) 730.

Computing device or server 700 further includes I/O interface(s) 750. I/O interface(s) 750 allows for input and output of data with external device(s) 760 that may be connected to computing device or server 700. Computing device or server 700 further includes network interface(s) 740 for communications between computing device or server 700 and a computer network.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the C programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/ or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 8:
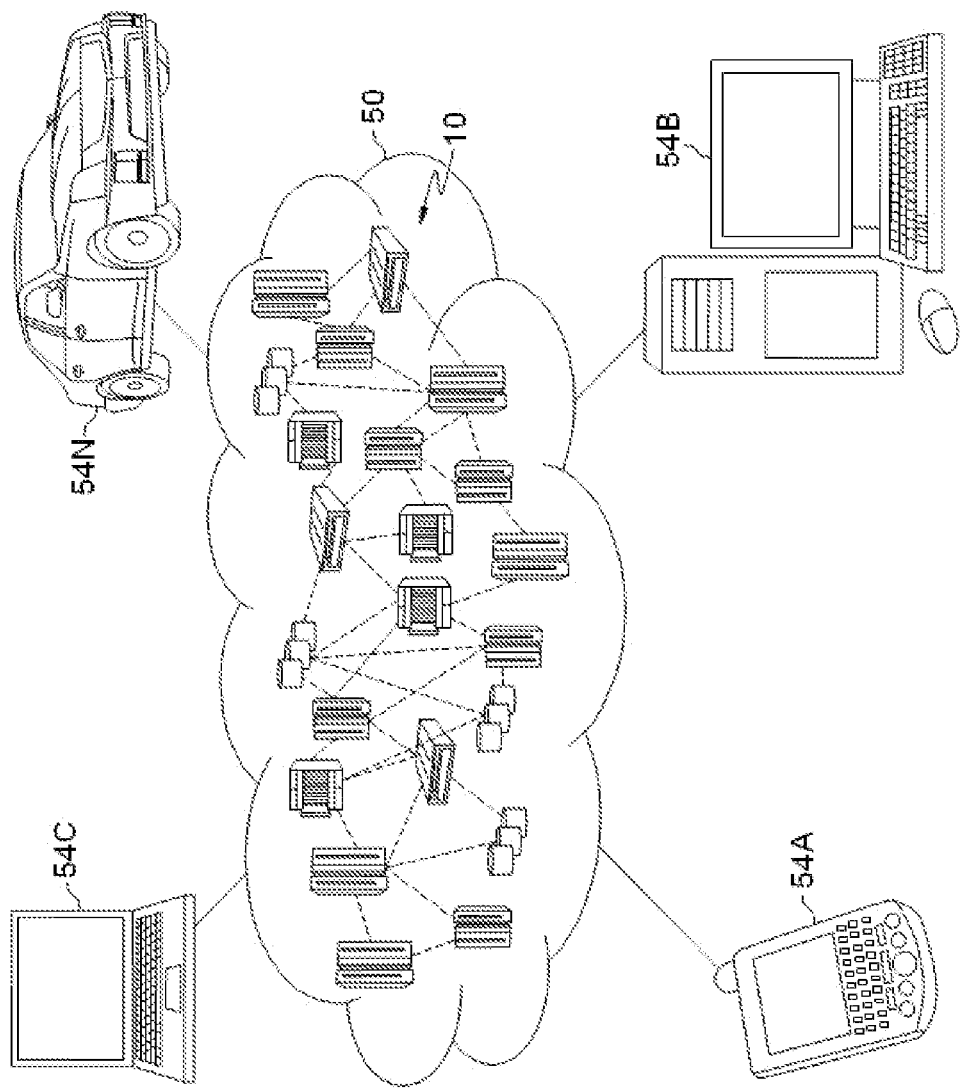
FIG. 8 depicts a cloud computing environment, in accordance with one embodiment of the present invention.

Referring now to FIG. 8, illustrative cloud computing environment 50 is depicted. As shown, cloud computing environment 50 includes one or more cloud computing nodes 10 with which local computing devices are used by cloud consumers, such as mobile device 54A, desktop computer 54B, laptop computer 54C, and/or automobile computer system 54N. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N are intended to be illustrative only and that computing nodes 10 and cloud computing environment 50 can communicate with any type of computerized device over any type of network and/or network addressable connection (e.g., using a web browser).

Figure 9:
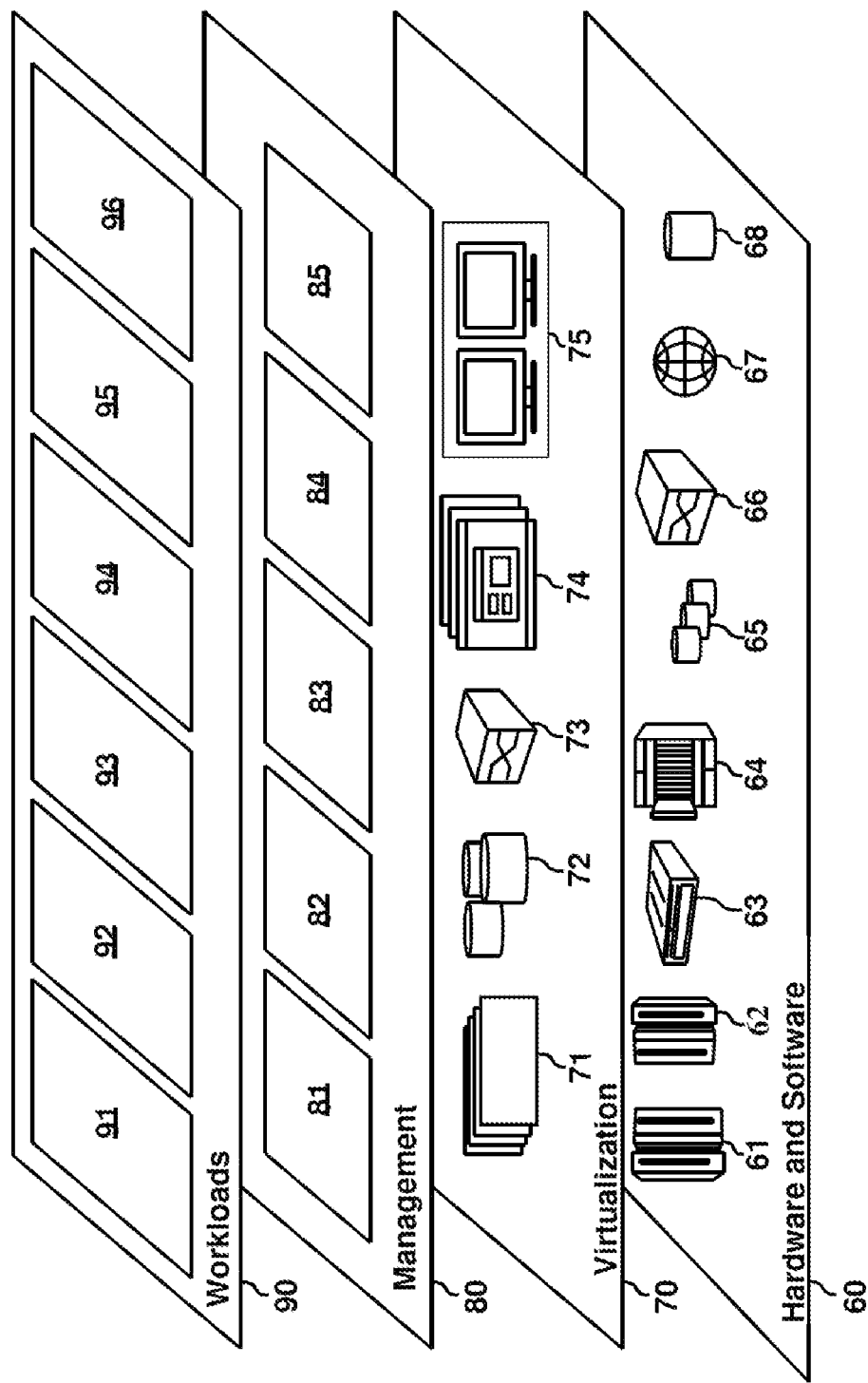
FIG. 9 depicts abstraction model layers in a cloud computing environment, in accordance with one embodiment of the present invention.

Referring now to FIG. 9, a set of functional abstraction layers provided by cloud computing environment 50 (FIG. 8) is shown. It should be understood in advance that the components, layers, and functions shown in FIG. 9 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and function 96. Function 96 in the present invention is the functionality of dependency tree-based data augmentation for sentence well-formedness judgement.

What is claimed is:

1. A computer-implemented method for dependency tree-based data augmentation for sentence well-formedness judgement, the method comprising:
    applying a dependency parser to a set of sentences;
    counting frequencies of respective dependency relations;
    choosing a predetermined number of most frequent dependency tags;
    determining an average depth of each of the most frequent dependency tags;
    re-ranking the most frequent dependency tags according to average depths of respective ones of the most frequent dependency tags;
    assigning predetermined rating scores to the most frequent dependency tags according to the average depths;
    for each of the predetermined rating scores, constructing a dependency tag probability distribution;
    applying a dependency parser to generate a first dependency tree for a first sentence;
    sampling tokens to be removed from the first dependency tree according to a removal ratio for a corresponding predetermined rating score and the dependency tag probability distribution;
    removing one or more nodes in the dependency tree according to the removal ratio;
    generating, from the dependency tree, a partial tree for the sentence;
    outputting a rated sentence based on the partial tree; and
    wherein the rated sentence is used as training data.

2. The computer-implemented method of claim 1, further comprising:
    receiving inputs including the set of sentences originating from an arbitrary collection of texts and a set of removal ratios for respective ones of the predetermined rating scores, including the removal ratio for the corresponding predetermined rating score.

3. The computer-implemented method of claim 1, further comprising:
    generating, in addition to the rated sentence, a set of rated sentences for remaining sentences in the set of sentences, wherein the set of rated sentences are used as training data.

4. The computer-implemented method of claim 1, further comprising:
    applying the dependency parser to sentences in an arbitrary collection of texts;
    counting frequencies of respective dependency relations; and
    choosing a predetermined number of most frequent dependency tags.

5. The computer-implemented method of claim 1, further comprising:
    for each of the predetermined rating scores, randomly sampling tokens to be removed from the first dependency tree, according to the removal ratio.

6. The computer-implemented method of claim 1, wherein the average depth is determined by averaging depths of the each of the most frequent dependency tags in dependency trees of the set of sentences.

7. A computer program product for dependency tree-based data augmentation for sentence well-formedness judgement, the computer program product comprising a computer readable storage medium having program instructions embodied therewith, the program instructions executable by one or more processors, the program instructions executable to:

apply a dependency parser to sentences in an arbitrary collection of texts;

count frequencies of respective dependency relations;

choose a predetermined number of most frequent dependency tags;

determine an average depth of each of the most frequent dependency tags;

re-rank the most frequent dependency tags according to average depths of respective ones of the most frequent dependency tags;

assign predetermined rating scores to the most frequent dependency tags according to the average depths;

for each of the predetermined rating scores, construct a dependency tag probability distribution;

apply a dependency parser to generate a first dependency tree for a first sentence;

sample tokens to be removed from the first dependency tree according to a removal ratio for a corresponding predetermined rating score and the dependency tag probability distribution;

remove one or more nodes in the dependency tree according to the removal ratio;

generate, from the dependency tree, a partial tree for the sentence;

output a rated sentence based on the partial tree; and wherein the rated sentence is used as training data.

8. The computer program product of claim 7, further comprising the program instructions executable to:

receive inputs including the set of sentences originating from an arbitrary collection of texts and a set of removal ratios for respective ones of the predetermined rating scores, including the removal ratio for the corresponding predetermined rating score.

9. The computer program product of claim 7, further comprising the program instructions executable to:

generate, in addition to the rated sentence, a set of rated sentences for remaining sentences in the set of sentences, wherein the set of rated sentences are used as training data.

10. The computer program product of claim 7, further comprising the program instructions executable to:

apply the dependency parser to sentences in an arbitrary collection of texts;

count frequencies of respective dependency relations; and choose a predetermined number of most frequent dependency tags.

11. The computer program product of claim 7, further comprising the program instructions executable to:

for each of the predetermined rating scores, randomly sample tokens to be removed from the first dependency tree, according to the removal ratio.

12. The computer program product of claim 7, wherein the average depth is determined by averaging depths of the each of the most frequent dependency tags in dependency trees of the set of sentences.

13. A computer system for dependency tree-based data augmentation for sentence well-formedness judgement, the computer system comprising one or more processors, one or more computer readable tangible storage devices, and program instructions stored on at least one of the one or more computer readable tangible storage devices for execution by at least one of the one or more processors, the program instructions executable to:

averaging depths of dependency tags in a set of dependency trees to determine an average depth corresponding to each dependency tag;

ranking the dependency tags according to the average depth of respective ones of the dependency tags;

assigning predetermined rating scores to the dependency tags according to the average depths;

for each of the predetermined rating scores, constructing a dependency tag probability distribution;

apply a dependency parser to generate a dependency tree for a sentence;

sampling tokens to be removed from the first dependency tree according to a removal ratio for a corresponding predetermined rating score and the dependency tag probability distribution;

remove one or more nodes in the dependency tree, according to sampled tokens;

generate, from the dependency tree, a partial tree for the sentence;

output a rated sentence based on the partial tree; and wherein the rated sentence is used as training data.

14. The computer system of claim 13, further comprising the program instructions executable to:

receive inputs including the set of sentences originating from an arbitrary collection of texts and a set of removal ratios for respective ones of the predetermined rating scores, including the removal ratio for the corresponding predetermined rating score.

15. The computer system of claim 13, further comprising the program instructions executable to:

generate, in addition to the rated sentence, a set of rated sentences for remaining sentences in the set of sentences, wherein the set of rated sentences are used as training data.

16. The computer system of claim 13, further comprising the program instructions executable to:

apply the dependency parser to sentences in an arbitrary collection of texts;

count frequencies of respective dependency relations; and choose a predetermined number of dependency tags.

17. The computer system of claim 13, further comprising the program instructions executable to:

for each of the predetermined rating scores, randomly sample tokens to be removed from the first dependency tree, according to the removal ratio.

18. The computer system of claim 13, wherein the average depth is determined by averaging depths of the each of the most frequent dependency tags in dependency trees of the set of sentences.

19. A computer-implemented method for dependency tree-based data augmentation for sentence well-formedness judgement, the method comprising:

averaging depths of dependency tags in a set of dependency trees to determine an average depth corresponding to each dependency tag;

ranking the dependency tags according to the average depth of respective ones of the dependency tags;

assigning predetermined rating scores to the dependency tags according to the average depths;

for each of the predetermined rating scores, constructing a dependency tag probability distribution;

applying a dependency parser to generate a first dependency tree for a first sentence;

sampling tokens to be removed from the first dependency tree according to a removal ratio for a corresponding predetermined rating score and the dependency tag probability distribution;

removing one or more nodes in the dependency tree, according to sampled tokens;

generating, from the dependency tree, a partial tree for the sentence;

outputting a rated sentence based on the partial tree; and wherein the rated sentence is used as training data.

20. The computer-implemented method of claim 19, further comprising:

applying the dependency parser to sentences in an arbitrary collection of texts;

counting frequencies of respective dependency relations; and choosing a predetermined number of dependency tags.

21. The computer-implemented method of claim 19, further comprising:

receiving inputs including the set of sentences originating from an arbitrary collection of texts and a set of removal ratios for respective ones of the predetermined rating scores, including the removal ratio for the corresponding predetermined rating score.

22. The computer-implemented method of claim 19, further comprising:

generating, in addition to the rated sentence, a set of rated sentences for remaining sentences in the set of sentences, wherein the set of rated sentences are used as training data.

23. A computer program product for dependency tree-based data augmentation for sentence well-formedness judgement, the computer program product comprising a computer readable storage medium having program instructions embodied therewith, the program instructions executable by one or more processors, the program instructions executable to:

average depths of dependency tags in a set of dependency trees to determine an average depth corresponding to each dependency tag;

rank the dependency tags according to the average depth of respective ones of the dependency tags;

assign predetermined rating scores to the dependency tags according to the average depths;

for each of the predetermined rating scores, construct a dependency tag probability distribution;

apply a dependency parser to generate a first dependency tree for a first sentence;

sample tokens to be removed from the first dependency tree according to a removal ratio for a corresponding predetermined rating score and the dependency tag probability distribution;

remove one or more nodes in the dependency tree, according to sampled tokens;

generate, from the dependency tree, a partial tree for the sentence;

output a rated sentence based on the partial tree; and wherein the rated sentence is used as training data.

24. The computer program product of claim 23, further comprising the program instructions executable to:

apply the dependency parser to a set of sentences;

count frequencies of respective dependency relations; and choose a predetermined number of most frequent dependency tags.

25. The computer program product of claim 23, further comprising the program instructions executable to:

receive inputs including the set of sentences originating from an arbitrary collection of texts and a set of removal ratios for respective ones of the predetermined rating scores, including the removal ratio for the corresponding predetermined rating score.

* * * * *